UNITED STATES PATENT OFFICE 1,953,512

DISAZO DYESTUFFS

Adolf Sieglitz and Konrad Stenger, Frankfort-on-the-Main, Germany, assignors to General Aniline Works, Inc., New York, N. Y., a corporation of Delaware No Drawing. Application June 3, 1933, Serial No. 674,260. In Germany June 11, 1932

5 Claims. (Cl. 260—77)

The present invention relates to new disazo dyestuffs, more particularly it relates to dyestuffs of the general formula:

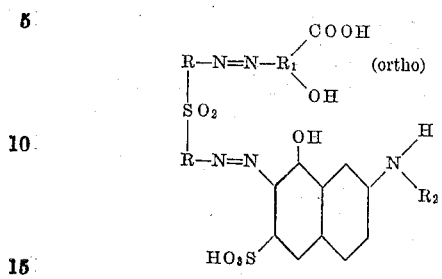

wherein the R's, $R_1$ and $R_2$ stand for radicals of the benzene series.

The new dyestuffs are obtainable by tetrazotizing a diamino-diphenylsulfone or a nuclear substitution product thereof and coupling one mol of the tetrazo compound with one mol of an ortho-hydroxy-carboxylic acid of the benzene series and one mol of a 2-arylamino-8-naphthol-6-sulfonic acid wherein the aryl radical is one of the benzene series. The dyestuffs, thus produced, yield brown tints on wool and possess good fastness properties; they are particularly distinguished by an excellent fastness to washing and fulling. In the form of chromed dyeings they yield likewise brown tints of very good fastness properties.

The following examples serve to illustrate the invention, but they are not intended to limit it thereto; the parts being by weight:

(1) 248 parts of 3.3'-diamino-diphenylsulfone are dissolved in water with addition of an excess of hydrochloric acid and tetrazotized at 0° C. to 5° C. with a solution of 138 parts of sodium nitrite. To the clear tetrazo solution, there is run a solution of 138 parts of salicylic acid in 40 parts of caustic soda and water. While stirring, a solution of sodium carbonate is then gradually added, until the excess of hydrochloric acid has been neutralized and the yellow intermediate dyestuff has precipitated. This dyestuff is filtered with suction, stirred with water and run into a solution of 315 parts of 2-phenylamino-8-naphthol-6-sulfonic acid in 60 parts of anhydrous sodium carbonate and water. There is obtained a reddish-brown dyestuff solution. When the coupling is finished, the whole is filtered in order to separate a small quantity of undissolved matter, the filtrate is warmed and the dyestuff is salted out by addition of common salt. The dyestuff forms a dark powder, dyeing wool beautiful brown tints of very good fastness to washing and fulling. By after-chroming the dyeing, a yellowish brown tint of very good fastness is obtained. The dyestuff possesses the following formula:

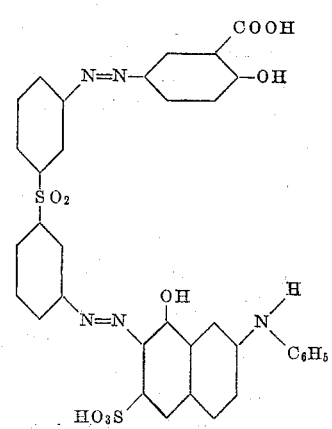

(2) By replacing in Example 1 248 parts of 3.3'-diamino-diphenylsulfone by 276 parts of 3.3'-diamino-4.4'-dimethyl-diphenylsulfone, there is obtained a dyestuff which has properties similar to those of the dyestuff obtainable according to Example 1, and which corresponds to the formula:

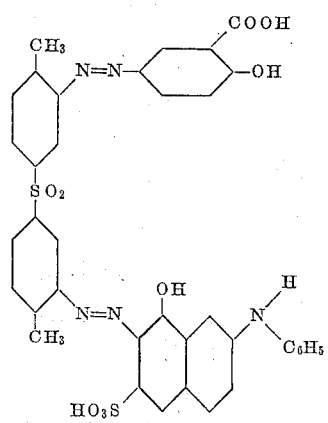

(3) According to the statements in Example 1, 248 parts of 4.4'-diamino-diphenylsulfone are transformed into the diazo compound and coupled first with 138 parts of salicyclic acid and then with 315 parts of 2-phenylamino-8-naphthol-6-sulfonic acid. There is obtained a brown dyestuff of very good fastness properties corresponding to the following formula:

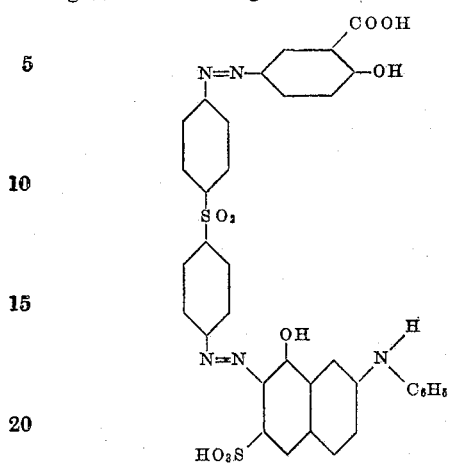

(4) By replacing in Example 1 138 parts of salicyclic acid by 152 parts of o-cresotinic acid, the dyestuff of the following formula

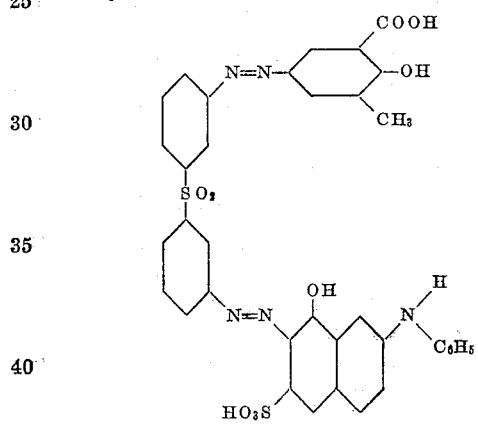

is obtained. The properties of this dyestuff are similar to those of the dyestuff obtainable according to Example 1.

(5) 315 parts of 2-phenylamino-8-naphthol-6-sulfonic acid, used in Example 1, are replaced by 327 parts of 2-p-tolylamino-8-naphthol-6-sulfonic acid. There is obtained a dyestuff of the following formula:

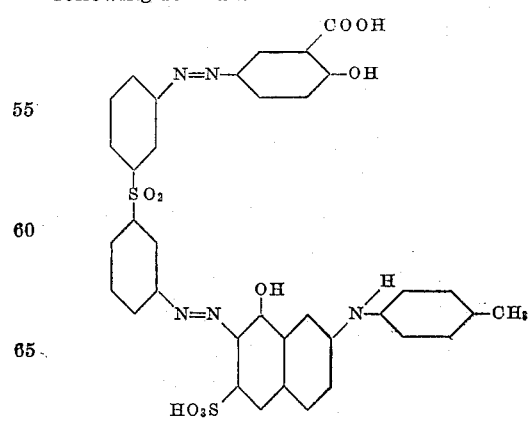

The dyestuff obtained has properties similar to those of the dyestuff obtainable according to Example 1.

(6) 408 parts of 3.3'-diamino-diphenylsulfone-disulfonic acid are diazotized. The diazo compound is coupled in a manner analogous to that described in Example 1 first with 138 parts of salicylic acid and then with 345 parts of 2-o-methoxyphenylamino-8-naphthol-6-sulfonic acid. There is obtained an olive-brown dyestuff of very good fastness properties. It has the following formula:

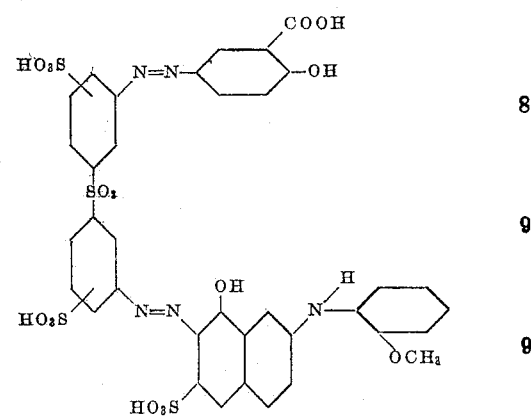

(7) By replacing in Example 1 248 parts of 3.3'-diamino-diphenylsulfone by 319 parts of 3.3'-diamino-4.4'-dichloro-diphenylsulfone, there is obtained a brown dyestuff of very good fastness properties which corresponds to the following formula:

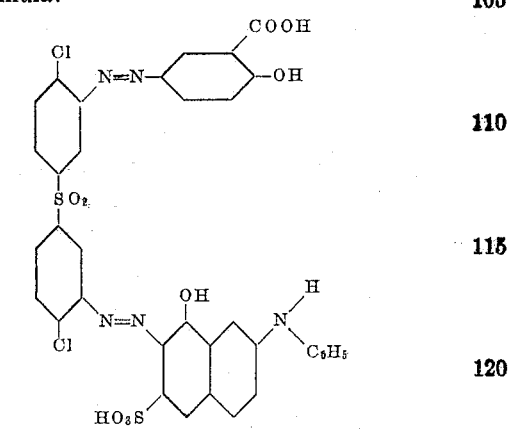

(8) 308 parts of 3.3'-diamino-4.4'-dimethoxy-diphenylsulfone are diazotized in a manner analogous to that described in Example 1. The diazo compound is coupled first with 138 parts of salicylic acid and then with 345 parts of 2.o-methoxy - phenylamino - 8 - naphthol -6-sulfonic acid as described in Example 6. There is obtained an olive-brown dyestuff of good fastness properties. It corresponds to the following formula:

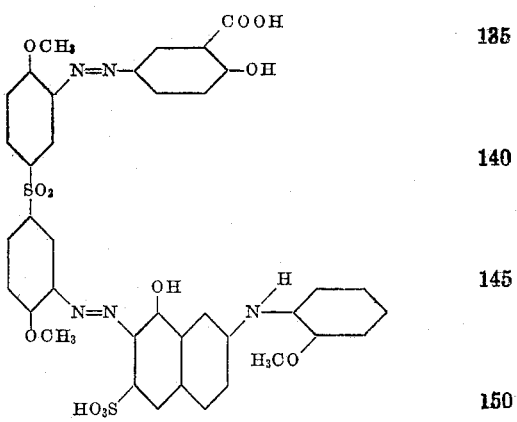

We claim:
1. The disazo dyestuff of the general formula:

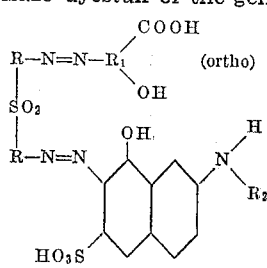

wherein the R's, R₁ and R₂ stand for radicals of the benzene series, yielding brown dyeings on wool.

2. The disazo dyestuffs of the general formula:

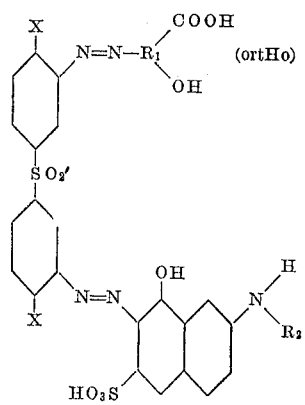

wherein the X's stand for hydrogen, alkyl, alkoxy, halogen or SO₃H, and R₁ and R₂ represent radicals of the benzene series, yielding brown dyeings on wool.

3. The disazo dyestuff of the formula:

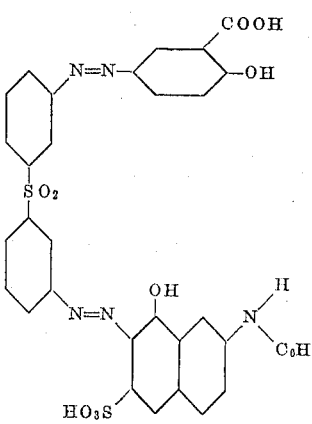

forming, when dry, a dark powder and yielding on wool brown dyeings of good fastness to washing and fulling which turn to fast yellowish-brown tints when afterchromed.

4. The disazo dyestuff of the formula:

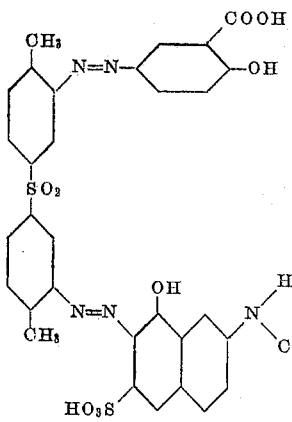

forming, when dry, a dark powder and yielding on wool brown dyeings of good fastness to washing and fulling which turn to fast yellowish-brown tints when afterchromed.

5. The disazo dyestuff of the formula:

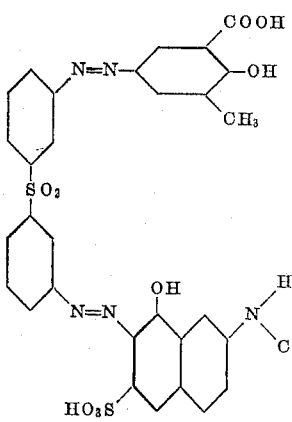

forming, when dry, a dark powder and yielding on wool brown dyeings of good fastness to washing and fulling which turn to fast yellowish-brown tints when afterchromed.

ADOLF SIEGLITZ.
KONRAD STENGER.